(12) United States Patent
Kong

(10) Patent No.: US 10,796,107 B2
(45) Date of Patent: Oct. 6, 2020

(54) UNIFIED EMBEDDINGS FOR TRANSLATION

(71) Applicant: SoundHound, Inc., Santa Clara, CA (US)

(72) Inventor: Terry Kong, Sunnyvale, CA (US)

(73) Assignee: SoundHound, Inc., Santa Clara, CA (US)

( * ) Notice: Subject to any disclaimer, the term of this patent is extended or adjusted under 35 U.S.C. 154(b) by 99 days.

(21) Appl. No.: 16/232,984

(22) Filed: Dec. 26, 2018

(65) Prior Publication Data
US 2020/0210529 A1 Jul. 2, 2020

(51) Int. Cl.
G06F 40/216 (2020.01)
G06F 40/58 (2020.01)
(Continued)

(52) U.S. Cl.
CPC .......... G06F 40/58 (2020.01); G06F 40/295 (2020.01); G06K 9/6232 (2013.01); G06K 9/6256 (2013.01)

(58) Field of Classification Search
CPC ............... G06F 16/951; G06F 16/9535; G06F 16/3347; G06F 16/3344; G06F 16/243; G06F 40/30; G06F 16/2237; G06F 16/24578; G06F 40/205; G06F 40/247; G06F 40/284; G06F 3/0482; G06F 16/24522; G06F 40/242; G06F 16/20; G06F 16/93; G06F 3/0481; G06F 3/04842; G06F 40/258; G06F 16/322; G10L 13/06; G10L 15/1815; G10L 19/032; G10L 19/022; G10L 19/08; G10L 19/18; G10L 19/00; G10L 19/0017; G10L 19/02;
(Continued)

(56) References Cited

U.S. PATENT DOCUMENTS 8,229,729 B2   7/2012 Sarikaya et al.
9,037,464 B1   5/2015 Mikolov et al.
(Continued)

OTHER PUBLICATIONS

Samuel L. Smith, et al., Offline bilingual word vectors, orthogonal transformations and the inverted softmax. arXiv preprint arXiv:1702.03859. Feb. 13, 2017.
(Continued)

Primary Examiner — Huyen X Vo
(74) Attorney, Agent, or Firm — Haynes Beffel & Wolfeld LLP; Andrew L. Dunlap

(57) ABSTRACT

A method of training word embeddings is provided. The method includes determining anchors, each comprising a first word in a first domain and a second word in a second domain, training word embeddings for the first and second domains, and training a transform for transforming word embedding vectors in the first domain to word embedding vectors in the second domain, wherein the training minimizes a loss function that includes an anchor loss for each anchor, such that for each anchor, the anchor loss is based on a distance between the anchor's second word's embedding vector and the transform of the anchor's first word's embedding vector, and for each anchor, the anchor loss for the respective anchor is zero when the distance between the respective anchor's second word's embedding vector and the transform of the respective anchor's first word's embedding vector is less than a specific tolerance.

13 Claims, 13 Drawing Sheets

(51) Int. Cl.
*G06K 9/62* (2006.01)
*G06F 40/295* (2020.01)

(58) Field of Classification Search
CPC .............. G10L 19/0212; G10L 19/265; G10L 19/0204; G10L 19/09; G10L 2025/903; G10L 2025/906; G10L 21/00; G10L 21/038; G10L 25/90; G10L 19/008; G10L 15/04; G10L 15/14; G10L 15/16
See application file for complete search history.

(56) References Cited

U.S. PATENT DOCUMENTS

| | | | |
|---|---|---|---|
| 9,805,028 B1 | 10/2017 | Sutskever et al. | |
| 2006/0265209 A1 | 11/2006 | Bradford | |
| 2010/0299336 A1* | 11/2010 | Bergstraesser | G06F 16/951 707/759 |
| 2011/0270604 A1 | 11/2011 | Qi et al. | |
| 2017/0068665 A1* | 3/2017 | Tamura | G06F 40/44 |
| 2017/0083510 A1 | 3/2017 | Dixon et al. | |
| 2018/0121799 A1* | 5/2018 | Hashimoto | G06F 40/216 |
| 2020/0134442 A1* | 4/2020 | Sim | G06N 3/08 |

OTHER PUBLICATIONS

Waleed Ammar, et al., Massively multilingual word embeddings. arXiv preprint arXiv:1602.01925. Feb. 5, 2016.
Alexis Conneau, et al., Word translation without parallel data. arXiv preprint arXiv:1710.04087. Oct. 11, 2017.
Guillaume Lample, et al., Unsupervised Machine Translation using Monolingual Corpora Only arXiv:1711.00043v1 Oct. 31, 2017.
Sebastian Ruder, et al., A survey of cross-lingual word embedding models. arXiv preprint arXiv:1706.04902. Jun. 15, 2017.
Ye Qi, et al., When and Why are Pre-trained Word Embeddings Useful for Neural Machine Translation?. arXiv preprint arXiv:1804.06323. Apr. 17, 2018.
Yong Cheng, et al., Semi-supervised learning for neural machine translation. arXiv preprint arXiv:1606.04596. Jun. 15, 2016.
Di He, et al., Dual learning for machine translation. InAdvances in Neural Information Processing Systems 2016 (pp. 820-828).
Yonghui Wu, et al., Google's neural machine translation system: Bridging the gap between human and machine ranslation. arXiv preprint arXiv:1609.08144. Sep. 26, 2016.
Tomas Mikolov, et al., Exploiting similarities among languages for machine translation. arXiv preprint arXiv:1309.4168. Sep. 17, 2013.
Edouard Grave, et al., Learning word vectors for 157 languages. arXiv preprint arXiv:1802.06893. Feb. 19, 2018.
Armand Joulin, et al., Improving Supervised Bilingual Mapping of Word Embeddings. arXiv preprint arXiv:1804.07745. Apr. 20, 2018.

* cited by examiner

UNIFIED EMBEDDINGS FOR TRANSLATION

FIELD OF TECHNOLOGY

The technology disclosed relates to machine translation of natural languages, and in particular, the use of word embeddings.

BACKGROUND

To perform their tasks, some machine translation systems depend on the use of word embedding vectors in an embedding space to represent the words of a specific language. Word embedding vectors are vectors in a low-dimensional vector space (the "embedding space") that provide semantic representations of the words in a natural language. A word embedding is a function that maps every word in a vocabulary to a word embedding vector in the embedding space. An example of mapping a word to a word embedding vector is illustrated in FIG. 1, which is related art. FIG. 1 shows an embodiment in which a particular word, before mapping, is represented by a high dimensional "1-hot" vector 110, a Boolean vector whose size is that of the vocabulary, and with only 1 bit being turned on. The word embedding 120 of FIG. 1 maps this particular word representation (vector 110) to a low-dimensional real-valued word embedding vector 130 having, for example, 200 dimensions. After projection through a word embedding, a language vocabulary may be viewed as a constellation of points in an embedding space of 200 dimensions, each point in the constellation being associated with a word in the vocabulary. Word embeddings are useful in many natural language processing (NLP) problems, including machine translation.

Word embeddings are created with machine learning techniques, using algorithms such as Word2Vec and Latent Semantic Analysis. They can be generated as a by-product of learning a neural network classifier whose output classes are the words themselves; embedding vectors are columns in the last matrix layer. After training, embeddings may be used in a live product. Better-trained word embeddings provide better translation systems. Training is very costly for a single domain (or language) pair, and the training of dozens or hundreds of languages, and thousands of language pairs, is prohibitive, in the absence of some form of transfer learning. Further, languages evolve over time, and it is essential to keep word embeddings updated.

A distance metric is defined between vectors in the embedding space. For example, the Euclidean distance may be used. In a particular context, the embedding space captures semantic information more accurately, as the number of dimensions increases. Example dimensions can be gender, social status, animate vs. inanimate, mobile vs. static, size, naturally occurring, difficult, goodness, etc., but not all dimensions in an embedding space need to have a straightforward interpretation. For a particular dimension in the embedding space (e.g., gender) all words with a similar value are closer to each other in that particular dimension.

Embeddings are created and trained using artificial intelligence and machine learning. Conventionally, an embedding is created for a particular language or domain, and it is trained using a neural network, based on a language corpus for the language or domain. In one approach to Machine Translation (MT), two embeddings (such as an English embedding and a Chinese embedding) are trained independently for each language. Next, based on a bilingual corpus, a correspondence (or transform, or mapping) is learned between the two embedding spaces. In the MT context, it is important to learn the best possible transform between word embedding vectors in the first language and word embedding vectors in the second language.

In a conventional approach to multi-lingual MT approach, every language pair is handled separately and requires the availability of a bilingual corpus for each language pair. Since $N(N-1)/2$ language pairs must be considered, the training process for N languages can be very costly. The costs in question include time (such as the cumulated training time for all $N(N-1)/2$ networks) and footprint (such as the cumulated size of the parameter data for the $N(N-1)/2$ networks) when bilingual corpuses are readily available. But for what is called "low-resource" languages, the data is not available, and the overwhelming cost would be that of collecting all the bilingual corpuses. But this effort is not cost-effective; the alternative is to use a bilingual corpus between each low-resource language and one reference language. This results in many fewer bilingual corpuses and training steps, provided a good transform exists between each low-resource language and a reference language.

The accuracy of a translation depends on the quality of the corpuses, but also of the techniques used to train the embeddings and transforms between embeddings. Conventionally, transforms have been trained using somewhat rigid techniques. Greater flexibility will reduce the cost of training, and can also lead to better translations.

SUMMARY

The technology disclosed relates to the use of word embeddings and transforms, and in particular to their application in machine translation of natural languages. It provides improved techniques for training transforms between word embedding vectors in two language domains. It relies on the use of "anchors" (pairs of words that share a meaning) to train a transform between word embedding vectors in one language and word embedding vectors in another language. The trained transform supports translation tasks between languages (or domains).

The technology disclosed includes the relaxation of constraints on transforms, during the training of a transform between word embedding vectors, through the use of a predetermined distance tolerance. Such relaxation allows a transform to be trained faster, and especially to have greater quality. A transform trained in this manner provides more accurate translations.

As illustrated in FIG. 2, a "unified embedding" for translating a first domain to a second domain comprises (i) a Domain 1 word embedding 211, that maps each word (s-word 201) in the first domain to first embedding vector (vector 1) in a first embedding space 231 (ii) a second embedding in a second domain, and (iii) a transform that maps the first domain to the second domain, wherein the transform is trained based on anchors. In a first embodiment of the technology, the two embeddings are pre-trained separately, and the transform is trained in a later step. In a second embodiment of the technology, the two embeddings and the transform are trained jointly, in a single step. The use of joint training generally improves the accuracy of the results. In a variant of joint training, which is available when the two embedding spaces have the same number of dimensions, it is possible to do away with the transform altogether, and have the two embeddings from different domains map into the same embedding space.

The technology disclosed supports the translation from one language to another language and aims to integrate word embedding techniques with the use of the most reliable parts of a translation dictionary. Suppose one can identify (e.g., in a translation dictionary), pairs of words that are unambiguous translations of each other. In this disclosure, every such pair will be called an anchor. An "anchor" consists of a first word in a first language and a second word in a second language. Note that when referring to "words," the present disclosure also refers implicitly to phrases; for example, phrases such as "vacuum cleaner" or "seat belt" may be treated (or referred to) as a single word. The same applies to entities, such as "John Smith Jr." or "San Francisco" or "The Supreme Court".

Anchors may be interpreted as trusted semantic correspondences between the first language and the second language; they associate words (or phrases) that have corresponding meanings in the two languages. Specifically, the first word of the anchor from the first domain and the second word of the anchor from the second domain are known to have a close correspondence. Typically, this means they are synonymous, or at least are close enough in meaning to be acceptable translations of each other. Anchors will be used to constrain the transform between word embedding vectors in the first language and the second language to respect known semantic associations.

In an implementation, a method is provided to train word embeddings and transforms. The method comprises determining a plurality of anchors, each anchor comprising a first word in a first domain and a second word in a second domain, and training (i) a word embedding for the first domain; (ii) a word embedding for the second domain; and (iii) a transform that maps word embedding vectors in the first domain to word embedding vectors in the second domain. Further, according to an implementation, the training can minimize a loss function that includes an anchor loss for each anchor. Additionally, for each respective anchor of the plurality of anchors, the anchor loss for the respective anchor is based on the distance between the respective anchor's second word's embedding vector and the transform of the respective anchor's first word's embedding vector, and for each respective anchor of the plurality of anchors, the anchor loss for the respective anchor is zero when the distance between the respective anchor's second word's embedding vector and the transform of the respective anchor's first word's embedding vector is less than a specific tolerance.

This method of training can be performed by one or more processors executing computer instructions recorded onto a non-transitory computer-readable recording medium. A system can also implement the functionality of this method of training.

In another implementation, a method of translating a word in a first domain to a word in a second domain using a trained transform is provided. The method can include projecting, using a word embedding for a first domain, the word in the first domain to a word embedding vector in the first domain; transforming, using the trained transform, the word embedding vector in the first domain to a first word embedding vector in the second domain; and identifying a word in the second domain having a projection, using a word embedding for the second domain, to a second word embedding vector that is closest to the first word embedding vector in the second domain. Furthermore, the trained transform can be trained by (i) determining a plurality of anchors, each anchor comprising a first word in the first domain and a second word in the second domain; (ii) training the word embedding for the first domain; (iii) training the word embedding for the second domain; and (iv) training the transform to minimize a loss function that includes an anchor loss for each anchor. Moreover, for each respective anchor of the plurality of anchors, the anchor loss for the respective anchor can be based on the distance between the respective anchor's second word's embedding vector and the transform of the respective anchor's first word's embedding vector. Also, for each respective anchor of the plurality of anchors, the anchor loss for the respective anchor can be zero when the distance between the respective anchor's second word's embedding vector and the transform of the respective anchor's first word's embedding vector is less than a specific tolerance.

Additionally, this method of automatic translation can be performed by one or more processors executing computer instructions recorded onto a non-transitory computer-readable recording medium. A system can also implement the functionality of this method.

Particular aspects of the technology disclosed are described in the claims, specification and drawings.

DETAILED DESCRIPTION

The following detailed description is made with reference to the figures. Example implementations are described to illustrate the technology disclosed, not to limit its scope, which is defined by the claims. Those of ordinary skill in the art will recognize a variety of equivalent variations on the description that follows.

Figure 2:
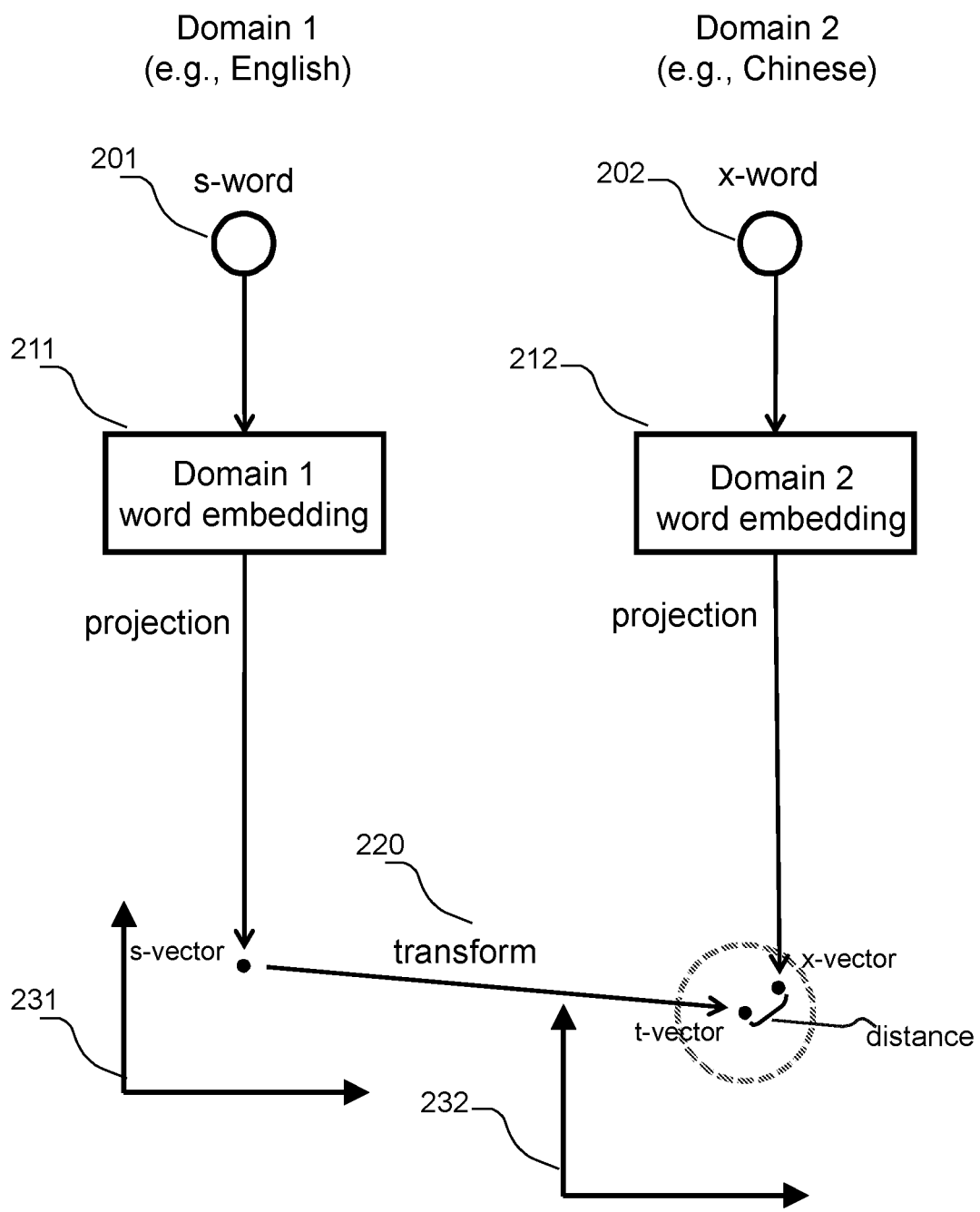
FIG. 2 illustrates a word translation module using two embeddings and a transform.

FIG. 2 illustrates an embodiment 200 of a word translation environment in which two pre-trained embeddings and a pre-trained transform are employed to translate a word or phrase from a first domain (Domain 1, e.g., English) to a word or phrase in a second domain (Domain 2, e.g., Chinese). A "source" word in the first domain (s-word 201) is received and projected using a Domain 1 word embedding 211 to a source word embedding vector (s-vector) in an embedding space 231 for Domain 1. Pre-trained transform 220 is then used to map s-vector (the projection of source word s-word) to a transformed vector t-vector in embedding space 232 for Domain 2. On the target language side (e.g., Chinese), any candidate word for translation (x-word 202) may be projected using a Domain 2 word embedding 212 to a word embedding vector (x-vector) in embedding space 232 for the second domain (e.g., Chinese). The translation algorithm involves a search over possible x-word candidates in Domain 2 (e.g., in the Chinese vocabulary) to identify an x-word whose x-vector projection is closest to the transformed vector t-vector in the embedding space 232. A word that minimizes the distance between t-vector and x-vector may be identified as a target word, i.e., a translation of the source word.

In some embodiments, multiple x-vector candidates may be considered close enough to t-vector to be retained, so that several x-word candidate translations will be identified. For example, there may be a N-closest policy, where (for some N, such as 3 or 4) the N x-vector projections closest to t-vector are retained; alternatively, there may be a "distance tolerance radius" (illustrated in FIG. 2 by a dotted circle) within which x-vector projections, if any, are always retained. In a more complete translation system, the word-by-word or phrase-by-phrase translation discussed in this disclosure is simply a component, and there are other components that may be able to improve accuracy by choosing between identified x-word hypotheses on the basis of other criteria. The architecture of such complete translation systems is beyond the scope of this disclosure.

Figure 3:
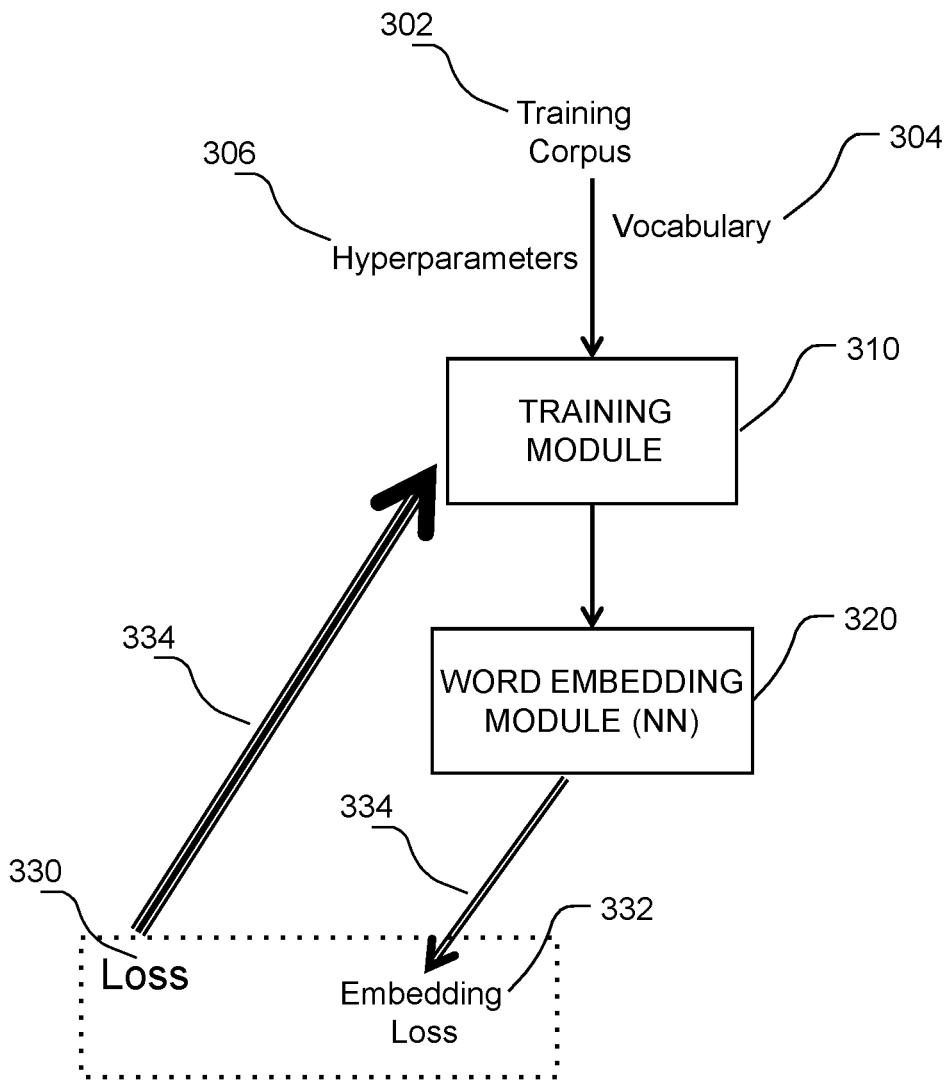
FIG. 3 illustrates a block diagram of a generic training environment in which a training module is used to create and train an embedding module.

Word embeddings are typically created using machine learning algorithms such as Word2Vec or LSA. FIG. 3 illustrates a block diagram of a generic training environment 300 in which a training module 310 is used to train a word embedding module 320. Hyperparameters 306 help define certain aspects of the output, including the dimensions of the embedding space.

In FIG. 3, a training module 310 receives as input: a training corpus 302, which is a large collection of sentences (sequences of words); a vocabulary 304, which is a set of words); and hyperparameters 306. The output of the training module 310 is a (trained) word embedding module 320, which can be a neural network (NN) or some other type of computer code capable of mapping a word to a vector in an embedding space; this mapping is called a word embedding. In this disclosure, the terms "word embedding" (a mathematical function) and "word embedding module" (the function's implementation) may be used interchangeably.

The training corpus 302 provides numerous examples of how a domain language is used in real situations; it should be statistically representative of the intended use. As opposed to a dictionary that provides word definitions, or a vocabulary that simply provides a list of words, the corpus provides the context in which the words are used. It is the manner in which a word determines its probable context, or conversely, in which the context determines the word, that is relevant to the creation of the word embedding. Typically, the larger and representative the corpus is, provided the training time is sufficient, the more accurate the word embedding can be. For example, if the word embedding module 320 is for English, it will associate each English word with numerical values in many dimensions, and each dimension can relate to a particular characteristic or label or aspect of the word's meaning.

In the case of a NN implementation of the word embedding module, the NN can be trained using back-propagation, according to standard techniques. This is based on the use of a loss function 330, which in this case is an embedding loss function 332. There are many possible choices for an embedding loss function 332. A simple choice is Euclidian distance; other choices will be discussed later. Training is an iterative procedure. After initialization of the NN weights (often with random values) each sentence in the corpus provides an input and a desired output for the neural network. The difference between the desired output and the NN's estimated output is evaluated using the embedding loss function 332. Total loss (as obtained using the lost function 330) is differentiated with respects to the weights in the preceding layers. Differences are back propagated through the network's layers, causing the adjustment of layer weights and biases, according to well-established practices. This step is performed across the entire corpus, and it can then be iterated. Hyperparameters typically determine either the number of iterations or other convergence criteria, a learning rate, and other aspects of the training. FIG. 3 shows the iterative nature of the process. The output estimates from the word embedding NN are sent 334 to the embedding loss function 332 and compared to the correct outputs (not shown). The embedding loss function 332, in this case, is the loss function 330, which drives the back-propagation process, which is carried out by the training module 310.

Figure 1:
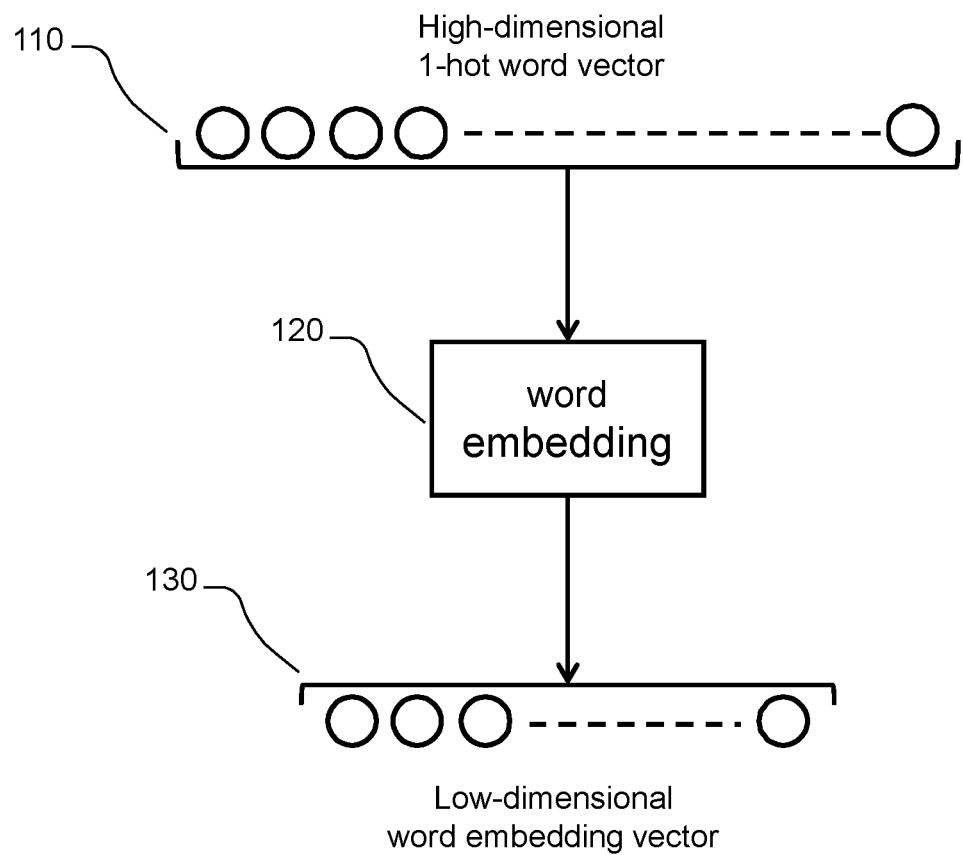
FIG. 1 illustrates a conventional word to vector embedding function.

After a word embedding is trained, as described in conjunction with FIG. 3, it is used in production as illustrated in FIG. 1. The figure shows the special case of a 1-hot representation of words but is easily generalized to other word representations. At production time, a trained word embedding module (such as word embedding module 320) maps every word in the vocabulary to a corresponding word embedding vector within an embedding space of low dimensionality.

Figure 4:
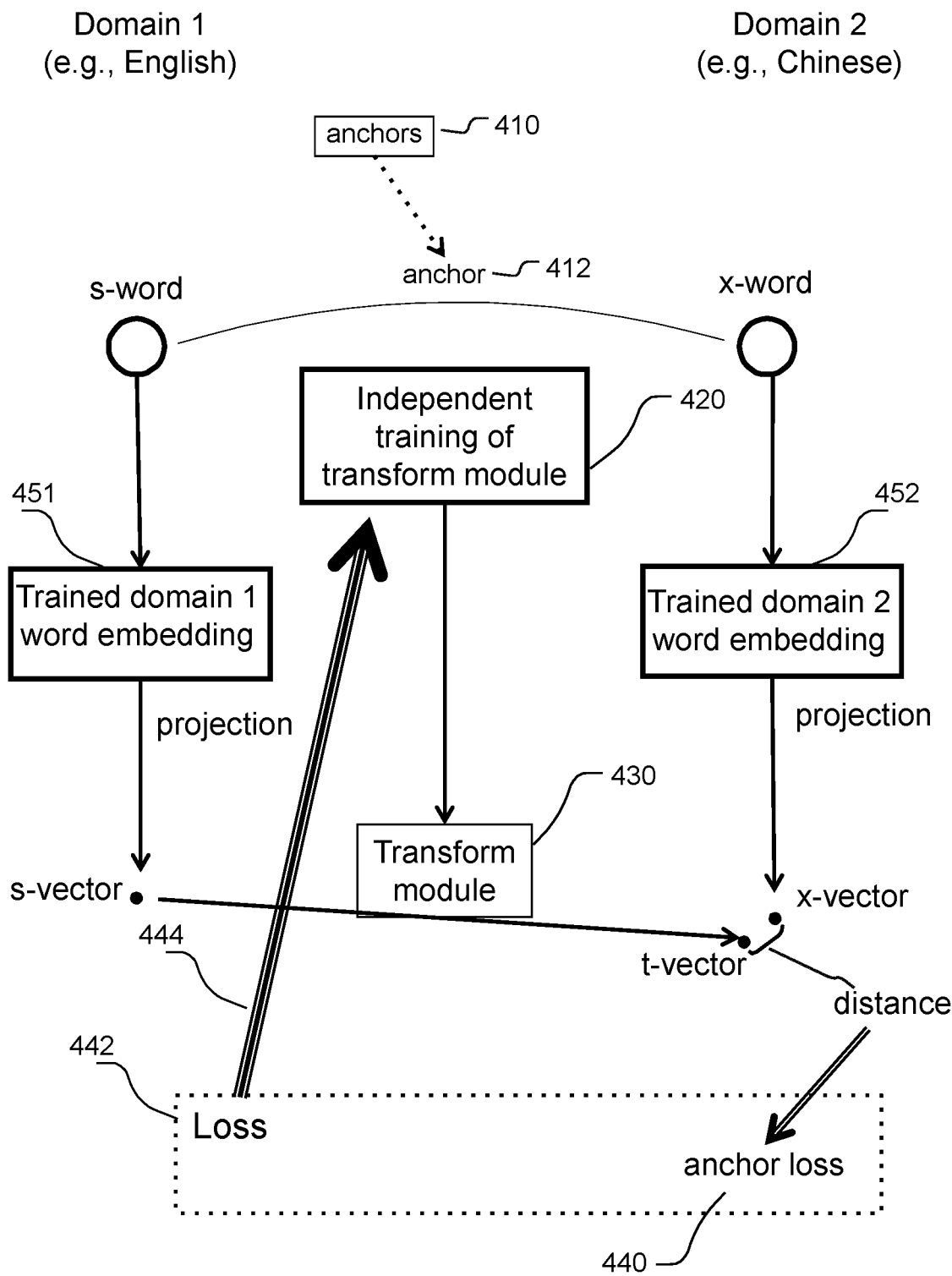
FIG. 4 illustrates a block diagram of an example training environment in which a transform is trained for word translation, using pre-trained word embeddings.

FIG. 4 illustrates a block diagram of an example training environment 400 in which a transform is trained for word translation, using pre-trained word embeddings. Embeddings 451 and 452 are both trained independently, using techniques presented in conjunction with FIG. 3, before training of the transform module 430 begins. The training focuses on anchors, and does not require the use of a multi-lingual corpus. In order to assist intuition, one can visualize (given a set of anchors 410) three constellations of vector endpoints: (1) the constellation of vectors in the domain 1 embedding space (such as s-vector) that are the projections of a source word (such as s-word) from an anchor 412 in the set of anchors 410; (2) the constellation of vectors in the domain 2 embedding space (such as t-vector) that are the transforms of a s-vector from the first constellation; and (3) the constellation of vectors in the domain 2 embedding space (such as x-vector) that are the projections of a translated word (such as x-word) from the same anchor 412 in the set of anchors 410. If we had perfect embeddings and a perfect transform, the first and the third constellations would be perfectly aligned. The independent training 420 of the transform module 430 aims to achieve the best possible alignment of the first and third constellations in the second embedding space.

This is achieved through the use of an anchor loss 440. The anchors 412 in the set of anchors 410 provide (input, output) pairs for the training of the transform. For every anchor—a (s-word, x-word) pair—the distance between t-vector (the transform of the projection s-vector of s-word)

and x-vector (projection of x-word) is measured, and a function of this distance is contributed to the anchor loss 440.

In an exemplary embodiment, the transform is an affine transform, and the transform module 430 is thus defined by a linear transform involving a matrix of weights to map and a bias vector. As before, training is an iterative procedure. After initialization of the matrix weights (e.g., with random values) and bias vector (e.g., with zeroes) each anchor pair (s-word, x-word) provides an input and a desired transform output. An anchor loss function (e.g., anchor loss 440) is computed as a function of the distance between t-vector and x-vector; it is cumulated over all anchors. The total loss 442 is differentiated with respects to the weight and bias coefficients. Anchor loss gradients are transmitted 444 to the back propagation module, which adjusts transform weights and biases repeatedly. This process is iterated until convergence, that is, until the loss has been minimized.

Figure 5:
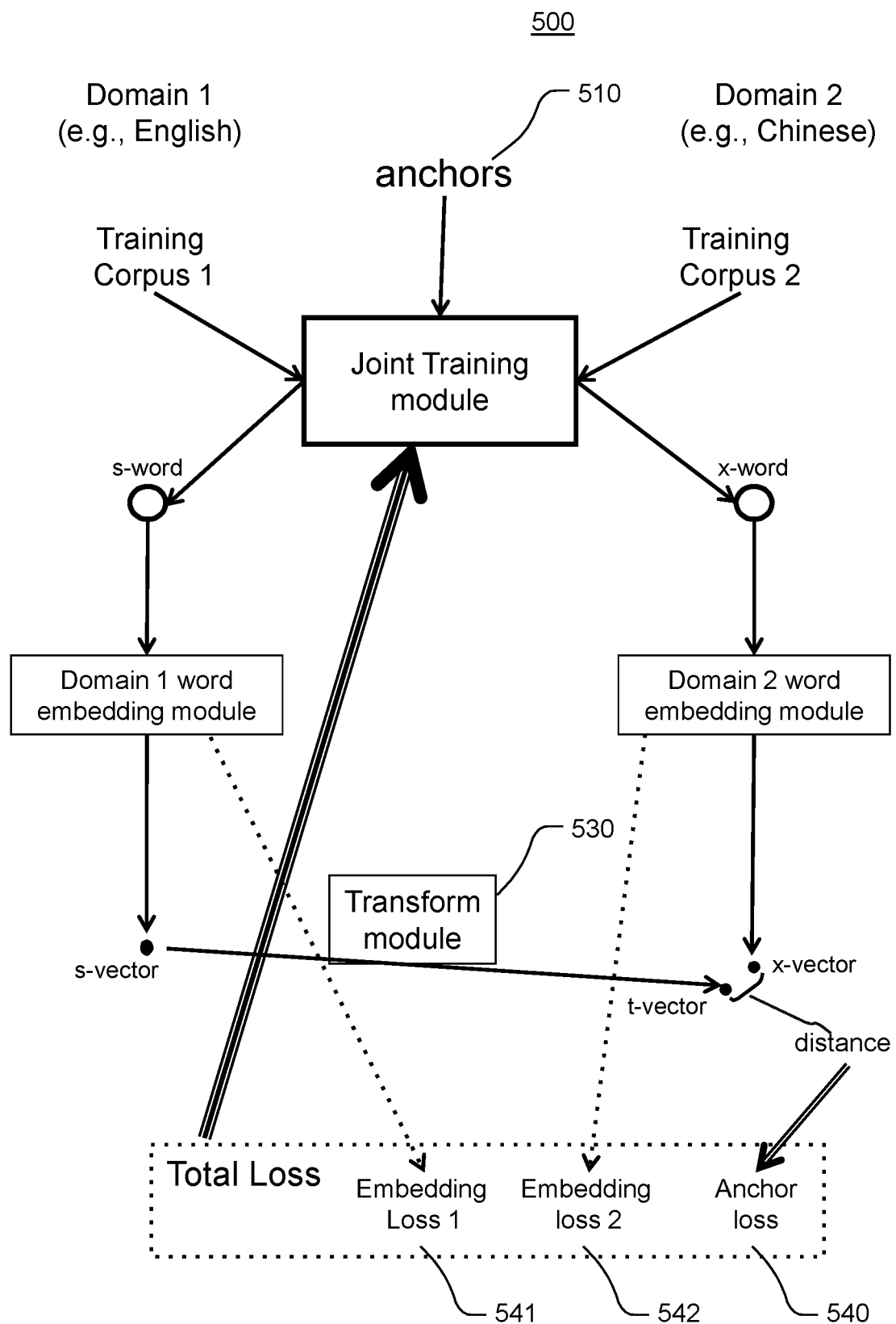
FIG. 5 illustrates a block diagram of an example training environment in which two-word embeddings and a transform are trained jointly for word translation tasks.

FIG. 5 illustrates a block diagram of an example training environment in which two-word embeddings and a transform are trained jointly for word translation tasks. In FIG. 5, the training is driven by a joint anchor loss that combines an embedding loss 541 for the domain 1 embedding module, an embedding loss 542 for the domain 2 embedding module, and an anchor loss 540 for the training of the transform module 530. The training data for training the domain 1 embedding module is found in a monolingual training corpus 1. The training data for training the domain 2 embedding module is found in a monolingual training corpus 2. The training data for training the transform module is found in the anchors 510. The key feature of the joint training is that the total loss combines three loss terms (541, 542, 540) so as to jointly minimize the word embeddings and the transform. The joint training module operates in the manner discussed in conjunction with FIGS. 3 and 4 with respect to each training iteration. Specifically, in a simple embodiment, an iteration step for the joint algorithm of FIG. 5 includes a single iteration step from the algorithm performed in FIG. 4 (going over the anchor set once and back-propagating once), and a single iteration step from the algorithm performed in FIG. 3 (going over the corpus once and back-propagating once), for each of training corpus 1 and training corpus 2.

Referring to FIG. 5 at a more concrete level, the first domain can be English, and the second domain can be Chinese. The transform module 530 (or a transform trained by the transform module 530) is thus trained to map the English embedding space to the Chinese embedding space. In many of the examples provided below, a domain represents a particular language in its entirety, such as "English" and "Chinese," or a specified sublanguage (such as simple English for computer maintenance as domain 1, and simple Chinese for computer maintenance as domain 1, or medical equivalents thereof).

Words in the English vocabulary are mapped by the English word embedding module to create English word embedding low-dimensional vectors. Similarly, the Chinese vocabulary is mapped by the Chinese word embedding module to Chinese word embedding low-dimensional vectors, which are not necessarily of the same dimension as the English ones. For example, an English embedding might have 200 dimensions compared to an English vocabulary of, say one million words) whereas a Chinese embedding might have, say, 300 dimensions, compared to a Chinese vocabulary of, say, five hundred thousand words. In both cases, the word embeddings greatly reduce the dimensionalities of vectors representing various words, but in different proportions.

In FIG. 5, the English embedding, the Chinese embedding and the transform module 530 (or a transform trained by the transform module 530) are trained jointly in a single pass, using the anchors, and two monolingual corpuses. Joint training is generally slower, with more parameters to update during each training cycle, but it does a better job of integrating all the constraints, resulting in greater translation accuracy. In contrast, in FIG. 4, the English embedding and Chinese embedding are pre-trained, and only the transform is trained.

Figure 10:
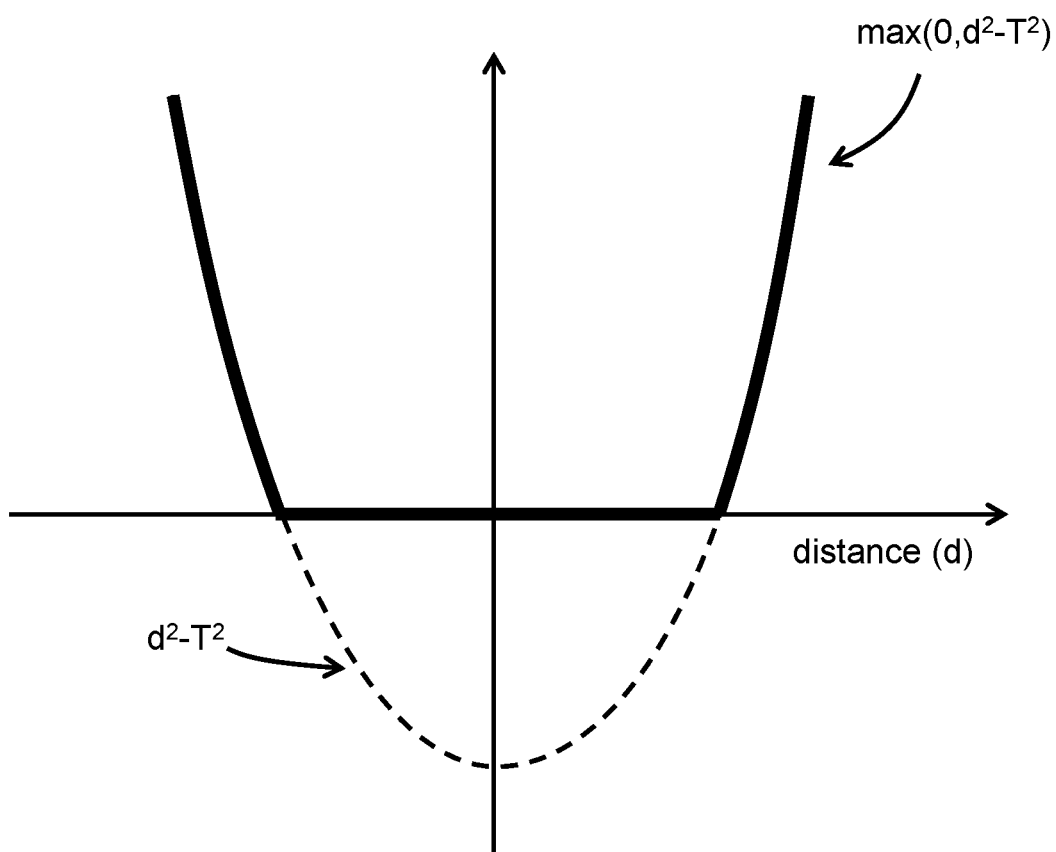
FIG. 10 illustrates the use of a distance tolerance threshold T.
Figure 11:
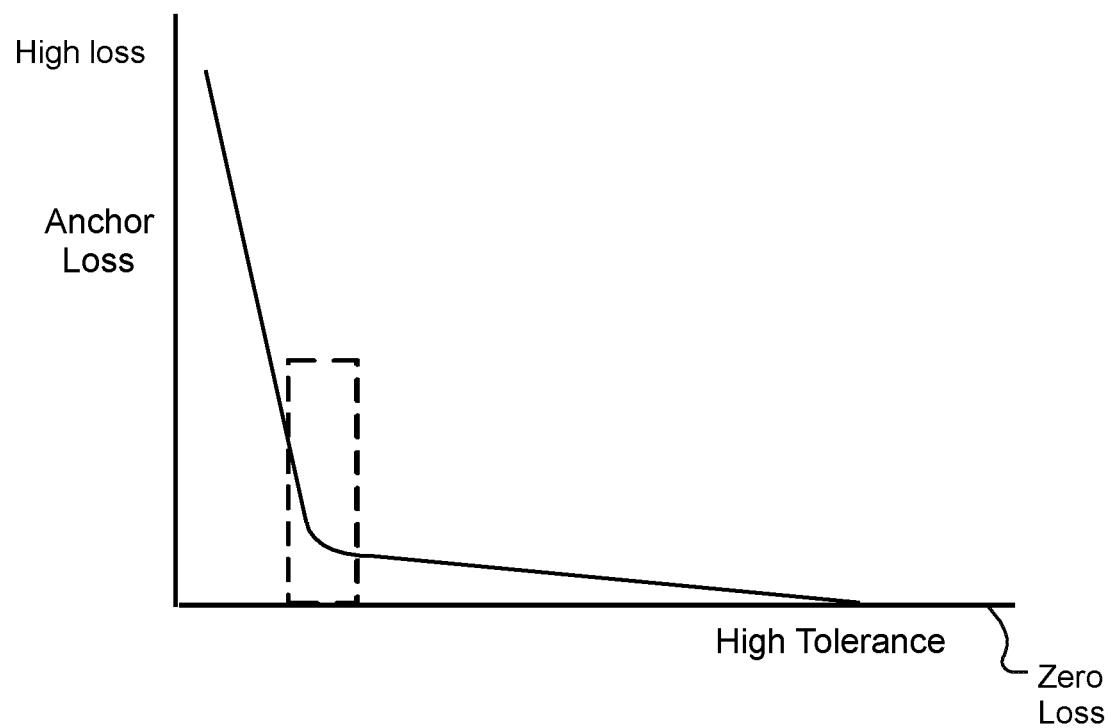
FIG. 11 illustrates one approach to choosing a tolerance threshold T.

In some embodiments, various meanings of a single word may be distinguished in the vocabulary. This may be based on syntactic distinctions, such as NOUN vs. VERB, or generally Part Of Speech (POS) tags. It may also be based on the different meanings of a verb or noun. For example, the dictionary entry PRESENT_1 can be used to represent the verb "present" (as in, to present an invoice) whereas PRESENT_2 can be the noun "present" (a gift) and PRESENT_3 can be the noun "present" (as opposed to the past or the future.) Such syntactic or semantic distinctions can create better and more accurate word embeddings, but they require the corpus to be labeled accordingly. Algorithms for POS tagging are known in the art, so at least part of this labeling can be done automatically. Anchors 510 are used to identify words in the English vocabulary that have direct translations to words in the Chinese vocabulary. Anchors 510 can be named entities, or can be pairs of words whose meanings are matched. These anchors 510 are used to create and train a transform module 530 (or a transform trained by the transform module 530) that allow for translation of a word or words from, for example, the English embedding to the Chinese embedding. Once the transform module 530 (or a transform trained by the transform module 530) is sufficiently trained, reliable translations from one domain (e.g., the English language) to another domain (e.g., the Chinese language) can be performed. Note that not all words have direct translations from one language to another language. But a word translation module can look for approximate matches. For example, an English word could be considered to have a sufficiently close correspondence to a Chinese word even if it is not an exact match. The Chinese word could be considered to have the sufficiently close correspondence simply based on the fact that it is the closest match according to a distance metric to an affine transform of the English word, by way of the word embedding vectors. Certain tolerance values can also be set in place, so that the embedding vector projections of the two words in an anchor do not necessarily need to be exact matches via the transform, but are allowed to be within a certain closeness, or distance tolerance (e.g., within a certain radius in terms of the Euclidean distance). This concept is discussed in more detail below with reference to FIG. 10.

To summarize the training environment 500 of FIG. 5: multiple anchors 510 are first identified between a first domain (e.g., in English) and a second domain (e.g. in Chinese). In this embodiment, an English word embedding is implemented as a neural network, and a Chinese word embedding is implemented as another neural network. Both word embeddings are trained based on monolingual corpuses. The transform module 530 (or a transform trained by the transform module 530) maps English word embedding vectors to Chinese word embedding vectors. In the set of anchors 510 each anchor is a pair consisting of an English word and a Chinese word with closely related meanings. The transform module 530 (or a transform trained by the transform module 530) is trained so that a particular English word vector representing an English word of a particular anchor transforms to a particular Chinese word vector representing a Chinese word of that same anchor—either exactly or approximately in the Chinese embedding space. The training of the transform module 530 (or a transform trained by the transform module 530) is implemented so as to minimize a loss function that includes an anchor loss for each anchor. Specifically, for each respective anchor of the anchors 510, the anchor loss for the anchor is based on a distance between the anchor's second word's embedding vector (e.g., the word embedding vector for the Chinese word) and the transform of the anchor's first word's embedding vector (e.g., the word embedding vector for the English word), such that for each respective anchor of the anchors 510, the anchor loss for the anchor is zero when the distance between the anchor's second word's embedding vector and the transform of the respective anchor's first word's embedding vector is less than a specific tolerance.

Additional visual explanations of how transform module 530 (or a transform trained by the transform module 530) is created from the anchors 510 are provided below with reference to FIG. 6, based on an example.

Figure 6:
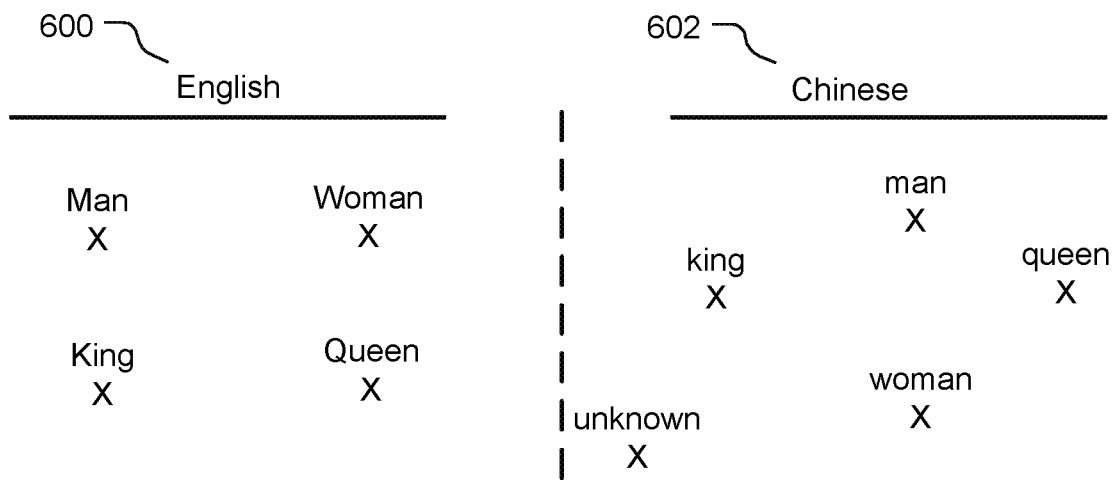
FIG. 6 illustrates embedding spaces of two different languages.

FIG. 6 illustrates example embedding spaces of two different languages.

In particular, FIG. 6 provides a two-dimensional example of an English embedding space 600 and a Chinese embedding space 602. As illustrated, the English embedding space 600 includes four words, "Man," "Woman," "King" and "Queen." Note that these words are actually represented by vectors in the English embedding space 600. With respect to this example illustrated in FIG. 6, when referring to the various words in the embedding spaces, we are actually referring to the word vectors representing each word. The locations of these words are based on the frequency each word occurs in the context of another. For example, "Man" is closer to "King" than "Queen," because a "Man," was present in more contexts surrounding the word "King" than for "Queen." The distances of the words from each other are merely examples. Furthermore, this example only has two dimensions, whereas an actual embedding space can have several hundreds of dimensions for each word. The Chinese embedding space 602 also includes the Chinese equivalent of "King," which is "king", the Chinese equivalent of "Man," which is "man," the Chinese equivalent of "Woman," which is "woman" and the Chinese equivalent of "Queen" which is "queen." These are not the actual equivalents in the Chinese language, but are merely for illustrative purposes. The actual Chinese translations for these words are: 国王 (king); 女王 (queen); 男人 (man); and 女人 (woman).

Referring to FIG. 6, observe that the orientations of the words are different between the English embedding space 600 and the Chinese embedding space 602, however, the positional relationship of the words is almost the same, modulo scaling, rotation, translation, or shearing operations. In other words, the embeddings for the four words are roughly off by an affine transform. An affine transform is defined by an equation of the form Y=XA+b where X is the original vector, Y is the transformed vector, A is a matrix, and b a bias term. The four-word pairs are anchors, because they are semantic equivalents of each other, and the affine transform maps the word embedding vectors in the first embedding space to word embedding vectors in the second embedding space.

Determining the best affine transform is the purpose of the training. As explained with FIG. 4, a matrix of coefficients is set up to represent the transform. In alternative embodiments, the transform is not necessarily limited to be an affine transform, it can have quadratic terms, for example, or use other types of transform that can be applied to embedding vectors for the known anchors. By establishing these anchors between English and Chinese, the technology disclosed is able to determine translations of other words based on the proximity to their embedding vectors. The Chinese embedding space 602 also includes a word "unknown," which represents a word (actually a word vector in the Chinese embedding space 602) that does not have an exact translation into English. In other words, the word "unknown" does not exist in English, even though it is a known word in Chinese. However, because the anchors are established between English and Chinese, it is possible, with a sufficiently trained transform, to determine a close or approximate translation of the word "unknown" into English based on its proximity to the English word embedding vectors.

Hereinafter, the description of the technology disclosed will simplify the discussion by using uppercase letter when referring to an English word embedding vector and a lowercase letter when referring to a Chinese word embedding vector (e.g., K=King and k=国王 (or king)). As mentioned above, each word in an embedding is represented by a vector. In this example, there is an M dimensional word vector representation for K and there is an N dimensional word embedding vector for k, where the M dimensional vector can be referred to as an M-dim vector and the N dimensional vector can be referred to as an N-dim vector.

Referring back to FIG. 5, the English and Chinese word embedding modules can use a neural network to implement a known class of algorithms called "word2vec" (such as skip-gram and continuous bag of words). The output layer of the neural network in either case is the softmax layer or a variation of the softmax layer, such as, for example, hierarchical softmax, noise contrast estimation, or other candidate sampling methods. If NN(x) is a neural network acting on the input x and y is the desired output, then if the loss function of the neural network is the negative log-likelihood function, one can formulate the embedding loss as:

$$\text{Embedding\_Loss} = -\Sigma_{x,y} \log(y * \text{softmax}(NN(x))) \quad (1)$$

The embedding loss function in Eq. (1) is simply an example. Other loss functions can be used, such as a loss function based on the L1 or the L2 norm.

The English embedding space 600 and the Chinese embedding space 602 are examples of what the embeddings might look like if they were learned or trained separately and projected onto two dimensions, rather than a few hundred dimensions.

The technology disclosed defines an anchor as a pair of words between two languages that are known to be unequivocal translations of each other. For example, as previously mentioned, King and king are anchor words that form the anchor (K, k). Other examples of anchors are discussed above. In the following discussion, as long as there is no possible confusion, we treat word embedding vectors as if they were the words themselves.

Each anchor $(\vec{K}, \vec{k})$ results in a constraint on the transform:

$$\vec{K}_{A+b} = \vec{k} \quad (2); \text{ or equivalently}$$

$$\vec{K}_{A+b} - \vec{k} = 0 \quad (3),$$

where A is an M by N matrix and b is an N dimensional vector. Let's assume M≥N (that is, the larger space is projected to a smaller space). Otherwise, A and b can be defined after swapping M and N (and the anchors), obtaining the same equations above.

When there are many anchors, Eq. (2) above (or (Eq. (3)) cannot be achieved exactly for every anchor pair. Since a neural network's training aims to minimize the loss function, this situation can be handled by the use of a loss function that includes anchor loss terms. In an implementation, the technology disclosed can incorporate the anchor into the loss function, for example, as:

$$\text{Loss} = \text{Loss1} + \text{Loss2} + \lambda \Sigma_{(X,x)} \|XA + b - x\|^2 \quad (4),$$

where Loss1 is the embedding loss for the first language, according to (say) Eq. (1), Loss2 is the embedding loss for the second language, according to (say) Eq. (1), $\lambda > 0$ is a regularization hyper-parameter and (X, x) is an anchor pair, representing two corresponding points in an anchor set. The third term involving the (X, x) anchor pair can be referred to as an anchor loss. In the example used above regarding anchor pairs, the anchor pairs (K, k), (M, m), (Q, q), and (W, w) can be incorporated into the final loss function by summing the negative log-likelihood losses (embedding losses) with the sum of all anchor losses, weighted by $\lambda$.

In an implementation that uses the joint loss function from Eq. (4), the technology disclosed uses a L2 loss, based on the square of distance between each respective anchor pair. The L2 loss encourages the corresponding anchor pairs to be close to each other in order to minimize the loss. The technology disclosed can also use a L1 loss when, for example, there is a larger number of anchor pairs and there is a desire to reduce the complexity of the learning task. Once the total loss reaches a minimum, the transform is essentially trained. Now the transform can be used to translate from one language to another language.

The technology disclosed provides an alternative implementation when M=N, instead of M≠N, as discussed above. When M≠N, the technology disclosed creates a separate word embedding vector for K and a separate word embedding vector for k, because the dimensions of K and k are different, and then learns the transform to transform between K and k. However, when M=N, there is no need to use and learn A and b, and the number of parameters can be lowered accordingly. In other words, when M=N, instead of learning embeddings for K, M, Q, W, k, m, q, w, x, the technology disclosed will only need to learn the embeddings for K, M, Q, W, x, where x is a Chinese word without an English equivalent. This can be achieved by sharing parameters across languages so that, for example, a particular location of K in an English embedding can also be used by a Chinese training session to represent k.

The number of anchors to be used is a hyperparameter that is set before the transform between one embedding and another embedding is created. An optimal number of anchors is not known for the success of the technique. At one extreme, if the technology disclosed use few or no anchors, the loss almost entirely depends on the embedding loss term used in (e.g.) word2vec, which leaves the transform under constrained, and likely to fail in producing good translations. At the other extreme, if the technology disclosed implements as many anchors as possible, the transform can be over constrained, and also likely to fail in producing the best translations.

In an implementation, the number of anchors could be an order of magnitude below the number of variables to be determined. For example, for a 200 dimension embedding to 250 dimension embedding, there are roughly 200×250=50,000 coefficients/parameters. An example range for the number of anchors could be somewhere between (say) 500 and 50,000, but the transform could have too few or too many constraints at either end of the range. An intermediate value of (say) 5000 anchors might be a good compromise. If there are too many anchors it can be difficult to train the transform to achieve loss goals that are desired. If there are too few, the transform is underdetermined. In some embodiments, an experimental approach is used to find a good number of anchors.

Another consideration, when determining the number of anchors, is the total number of words in the particular vocabularies. If a language only has 10,000 words, it is impossible to find 10,000 anchors. Generally, the number of anchors can only be a fraction (e.g., 5%-10%) of the total words of the smaller language of the two languages being considered.

There are situations where a particular word "y" in Chinese corresponds to two words "Y1" and "Y2" in English; or conversely. Such "many-to-one mappings" simply result in the use of multiple anchors, such as (in this example) one anchor for (Y1, y) and another anchor for (Y2, y). This will not cause problems with the technology disclosed. It allows for more accurate transforms between two embeddings. However, it will be more expensive to calculate the matrix A and the vector b.

Figure 7:
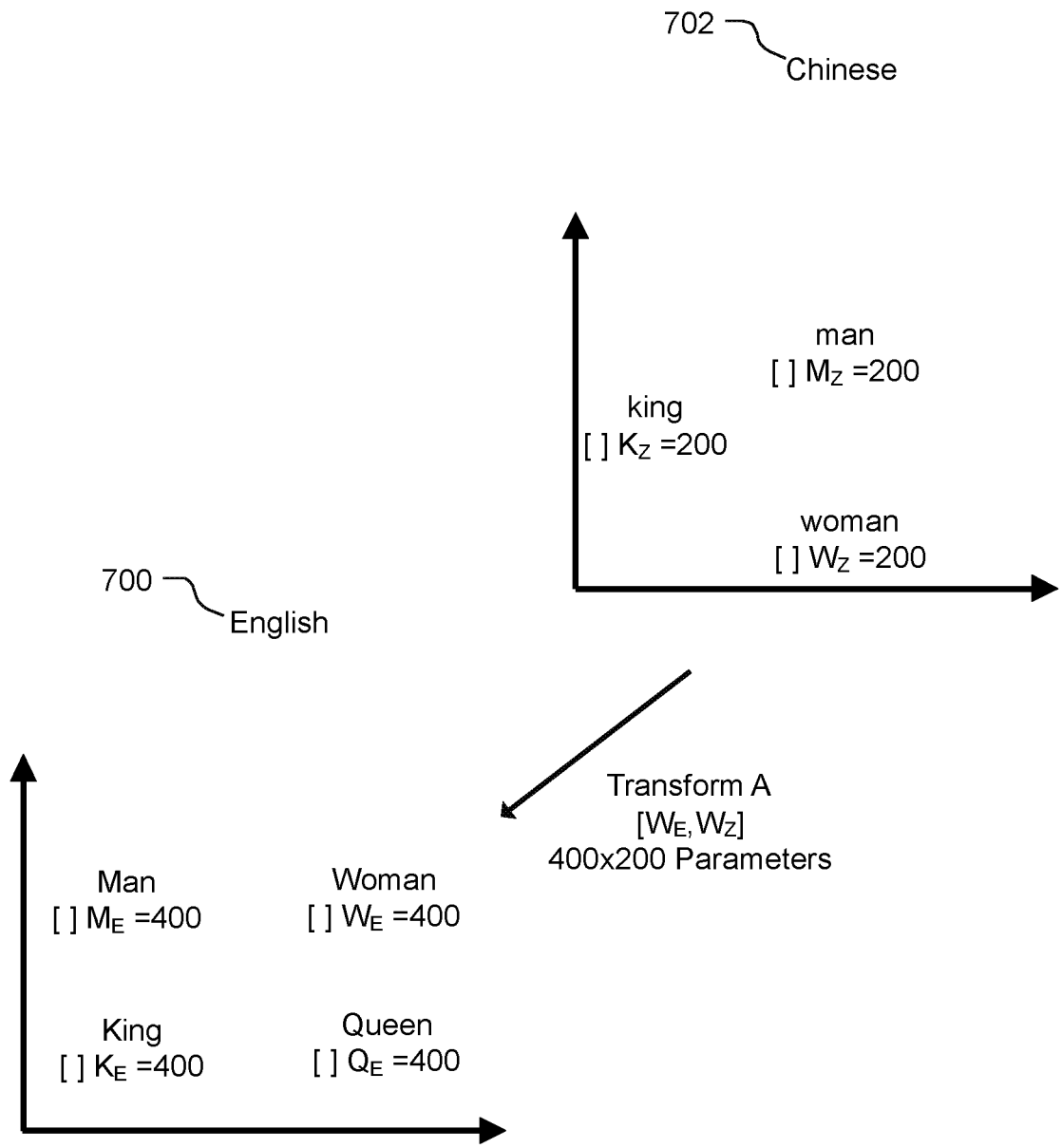
FIG. 7 illustrates an example of using a transform to translate a Chinese word to an English word.

FIG. 7 illustrates an example of using a transform to translate a Chinese word to an English word. Keeping with the example of FIG. 6, FIG. 7 illustrates an English embedding 700 that includes vector representations for the words Man, Woman, King and Queen and a Chinese embedding 702 that includes vector representations for the words man, woman, king and queen. The English word Man is represented by vector $M_E$ having 400 dimensions, the English word Woman is represented by vector $W_E$ having 400 dimensions, the English word King is represented by vector $K_E$ having 400 dimensions and the English word Queen is represented by vector $Q_E$ having 400 dimensions. Similarly, the Chinese word man is represented by vector $M_Z$ having 200 dimensions, the Chinese word woman is represented by vector $W_Z$ having 200 dimensions, the Chinese word king is represented by vector $K_Z$ having 200 dimensions and the Chinese word queen is represented by vector $Q_Z$ having 200 dimensions.

Since there is a direct translation of women in Chinese to Women in English, the technology disclosed creates the anchor for women and Women. In this example, the trained transform A that is capable of translating Chinese to English is an M-by-N matrix of 400×200 dimensions or parameters. The technology disclosed learns a transform based on the anchors, which is eventually implemented in production.

Figure 8:
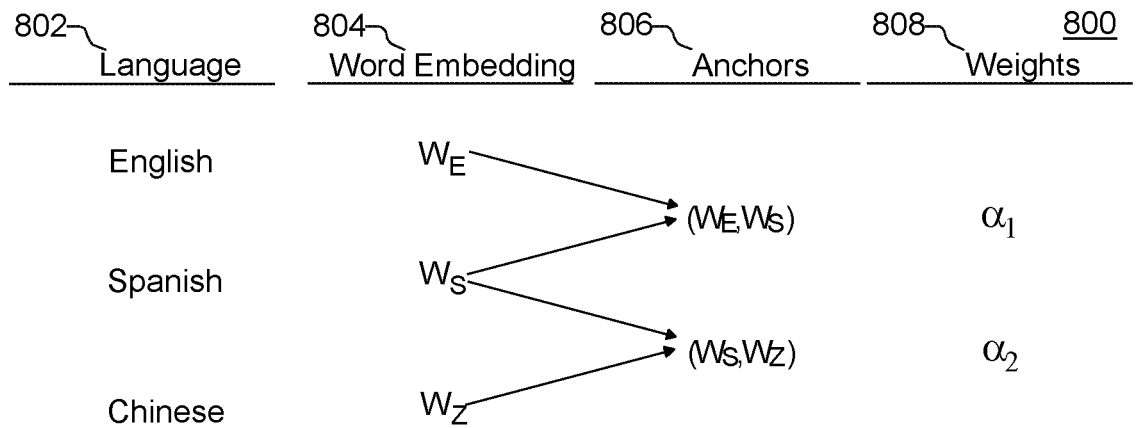
FIG. 8 illustrates an application of unified embeddings to more than two languages.

FIG. 8 illustrates implementing the technology disclosed using more than two languages.

The technology disclosed is capable of creating transforms between multiple languages using known anchors in the multiple languages. Intrinsically, some languages are more similar to each other than other languages. For example, English and Spanish are both Latin based languages and Chinese is a non-Latin-based language. Therefore, the anchors between English and Spanish should be given more weight than the anchors between Spanish and Chinese. FIG. 8 provides an illustration 800 of using different weights based on the similarities of the languages.

Specifically, FIG. 8 illustrates three different languages 802 and corresponding word vectors 804. For example, the English language has a word vector $W_E$ for the word Woman, the Spanish language has a word vector $W_S$ for the word Woman and the Chinese language has a word vector $W_Z$ for the word Woman. There are known anchors 806 between English and Spanish and between Spanish and Chinese. These known anchors can be implemented to create embeddings, models and transforms that can translate from English to Spanish to Chinese. For example, the English-Spanish anchor is ($W_E$, $W_S$) and the Spanish-Chinese anchor is ($W_S$, $W_Z$).

However, when creating a unified embedding the English-Spanish anchor should be given more weight than, for example, the Spanish-Chinese anchor because English and Spanish are more similar than Spanish and Chinese. Therefore, different weights 808, such as $\alpha_1$ and $\alpha_2$ can be assigned to anchors based on, for example, the similarity between the various languages and/or a known confidence of the two anchor words of the different languages.

In this example, $\alpha_1$ and $\alpha_2$ are scalar weights. As mentioned above, it is well known that the words or word vectors $W_E$ and $W_S$ are closer to each other than the word vectors $W_S$ and $W_Z$. Therefore, $\alpha_1$ should be greater than $\alpha_2$, where $\alpha_1+\alpha_2=1$. The weights $\alpha_1$ and $\alpha_2$ can be applied at the language level, or at the word level. In this example the shared word context is $W_S$. In an implementation, all weights $\alpha_1$ from the word $W_S$ could be required to sum up to 1. This concept can be implemented using the following formula for calculating the loss using various weights:

$$\text{Loss}=\text{Loss1}+\text{Loss2}+\lambda[\alpha_1\|W_E A_1+b_1-W_S\|^2 + \alpha_2\|W_S A_2+b_2-W_Z\|^2] \quad (5)$$

Furthermore, in a case of L languages, the technology disclosed can implement (L−1) affine transforms, using (L−1) weight matrices A and (L−1) bias vectors b.

Figure 9:
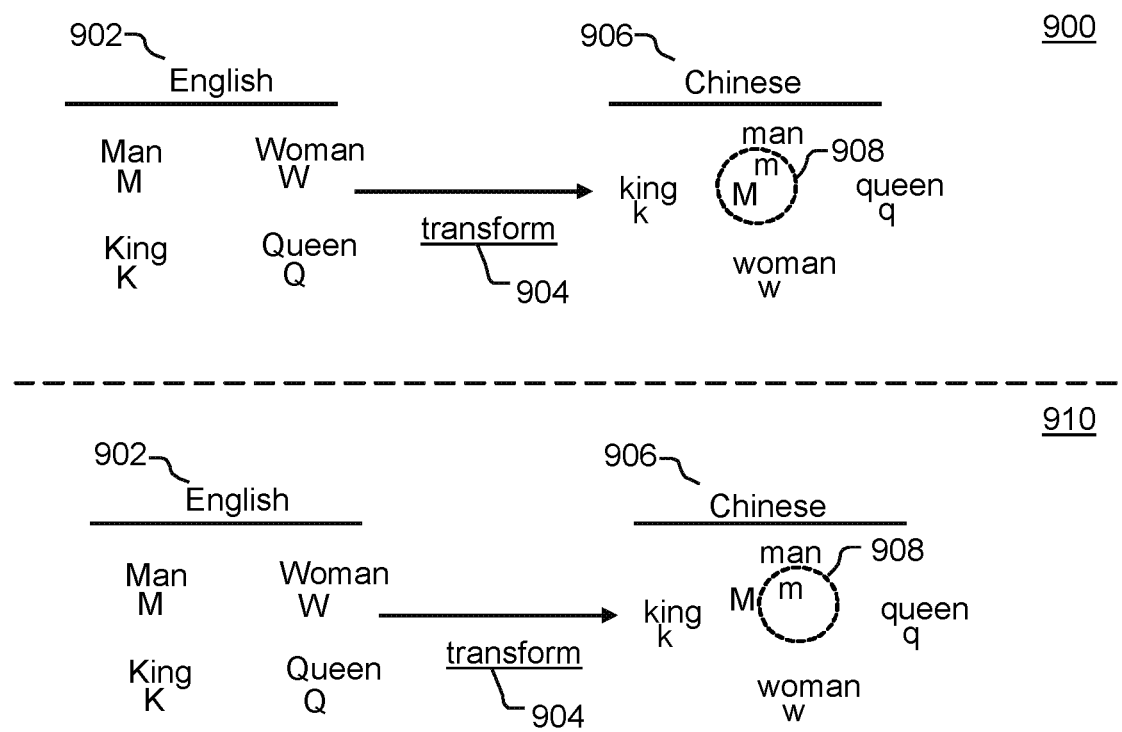
FIG. 9 illustrates an application of relaxing anchors to implement the creation of unified embeddings.

FIG. 9 illustrates an application of relaxing anchor loss with a tolerance to implement the creation of unified embeddings. The motivation is that sometimes it may not be possible or desirable to aim for a zero distance between vectors K and k when creating a transform. Such a goal (and the corresponding loss function) can simply be too strict. Accordingly, the technology disclosed can relax the definition of the loss function, aiming only for the transform of vector k to be within a certain radius of tolerance from vector K. This is done by introducing a "hinge loss" so that gradients back propagate an error only when the distance between an anchor and the transform of the second is larger than a distance tolerance T. This ignores, during training, any loss resulting from word pairs that are approximate matches between the two languages. The anchor loss associated with an anchor (X, x) depends on the distance $\|XA+b-x\|^2$ between the word embedding vector x and the transform XA+b of the word embedding vector X. But if the distance is below a threshold T, it will be ignored, that is, the corresponding anchor loss will be 0. This concept is illustrated in FIG. 10A. This "relaxation" can be implemented using the following formula:

$$\text{Loss}=\text{Loss1}+\text{Loss2}+\lambda E_{(X,x)} \max(0,\|XA+b-x\|^2-T^2) \quad (6)$$

Referring to FIG. 9, an illustration 900 is provided where the anchors are sufficiently relaxed and an illustration 910 is provided where the transform is not sufficient to align the anchors, despite the relaxation. Illustration 900 includes an English embedding 902, a transform 904 and a Chinese embedding 906. The transform 904 is used to align the anchors of the English embedding 902 to the anchors of the Chinese embedding 906. As illustrated, for example, a radius 908 surrounds the Chinese embedding for the word man, represented by "m." This radius 908 can represent a predetermined distance of tolerance in, for example, terms of Euclidean distance, normalized. The corresponding English embedding for Man, represented by "M" is within the radius 908, such that it is sufficiently close to the embedding for "m." Accordingly, using this "relaxation" allows the transform 904 to be acceptable even though there is some loss that occurs because "M" and "m" do not have the same exact locations or values when the transform 904 is applied.

Illustration 910 is similar to illustration 900, except that the "M" is not sufficiently close to the "m," despite the fact that there has been some "relaxation." Accordingly, the transform 904 needs further training or the radius 908 needs to be increased in order to achieve an acceptable level of closeness between "m" and "M."

The tolerance T is a distance hyperparameter than can be chosen arbitrarily. There are some techniques for finding a good range for tolerance distance T. In an implementation, T can by determined by examining the second (target language) embedding space: looking at every second language word's shortest distance to another second language word, the average (or the median) of all of those distances provides a good reference scale for the threshold, which could be set at a fraction of the scale (such as 0.5). This could be computed by pre-training the second embedding space on its own, and then using the trained second embedding space as the initial value for the training of the transform and also use embedding to determine the tolerance as described above.

In another embodiment, the tolerance distance hyperparameter T is allowed to vary, and one can observe the variation of the total anchor loss as a function of T, as illustrated in FIG. 10B. For high values of T, the anchor loss decreases, and for a high enough value of T, the anchor loss is zero (and the trained transform is unconstrained, and becomes unable to provide meaningful translations). For low values of T, the loss increases quickly, and it is maximum when T=0. The value of T can be chosen close to the knee of the curve of FIG. 10B.

Yet another approach is, instead of having T as a hyperparameter, to have it be a trained parameter, and to add a tolerance loss term to the total loss function.

The use of distance threshold T allows the transform to be trained in less time, and once the transform is trained, provides more meaningful and accurate translations. Specifically, the "wiggle room" allowed by the distance tolerance results in an easier convergence (improved efficiency) and appropriately constrained transforms (more meaningful translations).

Figure 12:
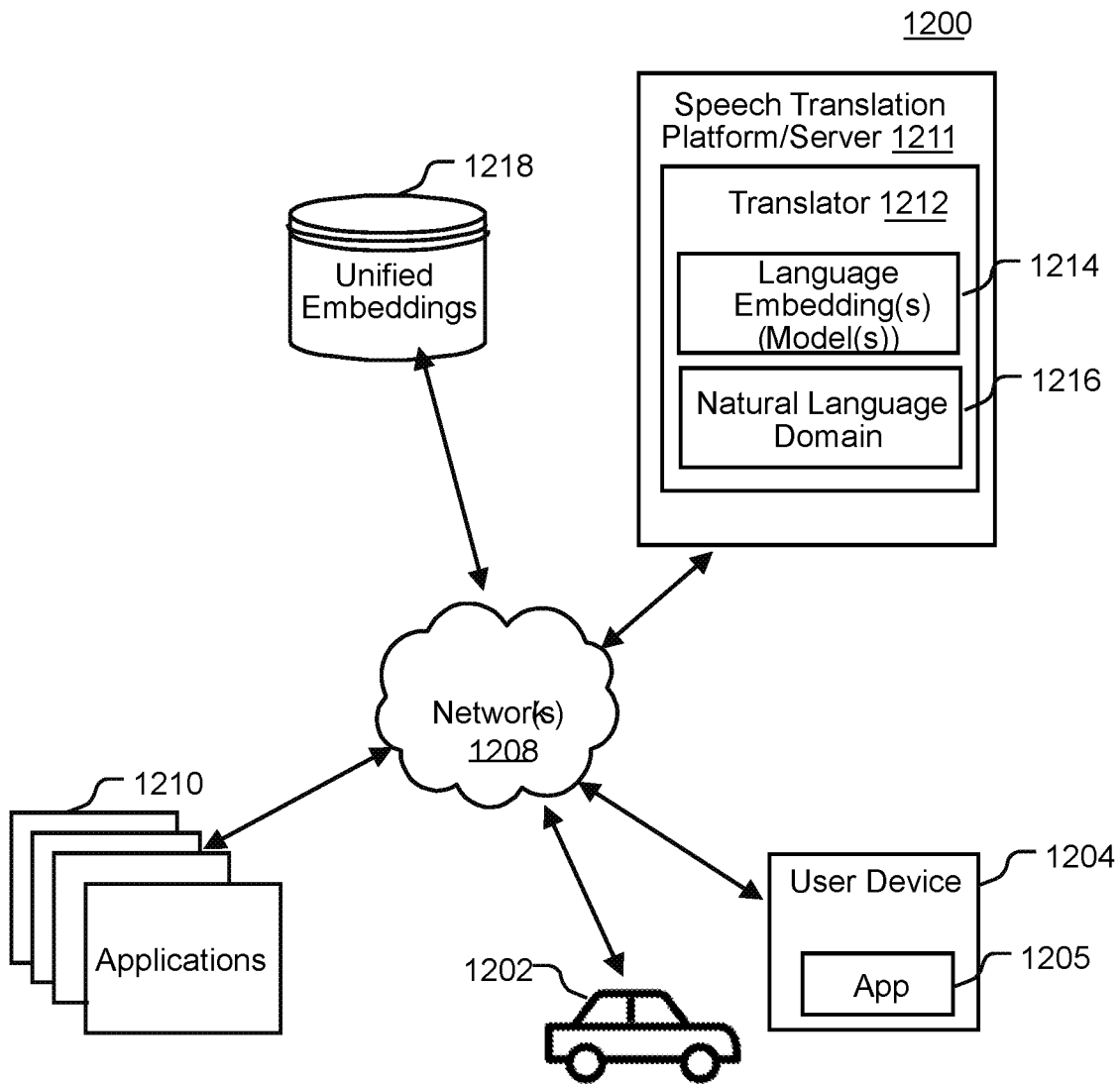
FIG. 12 illustrates an environment in which unified embeddings can be implemented.

FIG. 12 illustrates an example environment 1200 in which unified embeddings can be implemented. The environment 1200 includes at least one user device 1202, 1204. The user device 1202 could be a mobile phone, tablet, workstation, desktop computer, laptop or any other type of user device running an application 1205. The user device 1204 could be an automobile or any other combination of hardware and software that is running an application 1205. Various example implementations of these user devices are discussed in more detail below. The user devices 1202, 1204 are connected to one or more communication networks 1208 that allow for communication between various components of the environment 1200. In one implementation, the communication networks 1208 include the Internet. The communication networks 1208 also can utilize dedicated or private communication links that are not necessarily part of the Internet. In one implementation the communication networks 1208 uses standard communication technologies, protocols, and/or inter-process communication technologies.

The environment 1200 also includes applications 1210 that can be preinstalled on the user devices 1202, 1204 or updated/installed on the user devices 1202, 1204 over the communications networks 1208. The environment 1200 also includes a speech translation platform/server 1211, which is part of a speech recognition system. The speech translation platform/server 1211 can be a single computing device (e.g., a server), a cloud computing device, or it can be any combination of computing device, cloud computing devices, etc., that are capable of communicating with each other to perform the various tasks required to perform meaningful speech recognition. The speech translation platform/server 1211 includes a translator 1212 that performs, for example, the functions of the generic training environment 300 discussed above with reference to FIG. 3. Since the speech translation platform/server 1211 can be spread over multiple servers and/or cloud computing device, the operations of the translator 1212 can also be spread over multiple servers and/or cloud computing device. The applications 1210 can be used by and/or in conjunction with the translator 1212 to translate spoken input. The various components of the environment 1200 can communicate (exchange data) with each other using customized Application Program Interfaces (API) for security and efficiency.

The user devices 1202, 1204 and the translator 1212 each include memory for storage of data and software applications, a processor for accessing data in executing applications, and components that facilitate communication over the communications networks 1208. The user devices 1202, 1204 execute applications 1205, such as web browsers (e.g., a web browser application 1205 executing on the user device 1204), to allow developers to prepare and submit applications 1210 and allow users to submit speech audio including natural language utterances to be translated by the translator 1212. The translator 1212 essentially performs the functions of the example translating environments 400 and 500 discussed above with reference to FIGS. 4 and 5.

The translator 1212 implements one or more language embeddings (models) 1214 from a repository of unified embeddings 1218 that are created and trained using the techniques described throughout this application. The language embeddings (models) 1214 of the translator 1212 create a translation (transcription) of the received speech audio.

A natural language domain 1216 can be implemented by the translator 1212 in order to add real meaning to the translation (e.g., transcription) of the received speech audio. The natural language domain 1216 can put context and meaning to the translation.

The translator 1212 is implemented using at least one hardware component and can also include firmware, or software running on hardware. Software that is combined with hardware to carry out the actions of a translator 1212 can be stored on computer readable media such as rotating or non-rotating memory. The non-rotating memory can be volatile or non-volatile. In this application, computer readable media does not include a transitory electromagnetic signal that is not stored in a memory; computer readable media stores program instructions for execution. The translator 1212, as well as the applications 1210 and the repository of unified embeddings 1218 can be wholly or partially hosted and/or executed in the cloud or by other entities connected through the communications network 1208.

Figure 13:
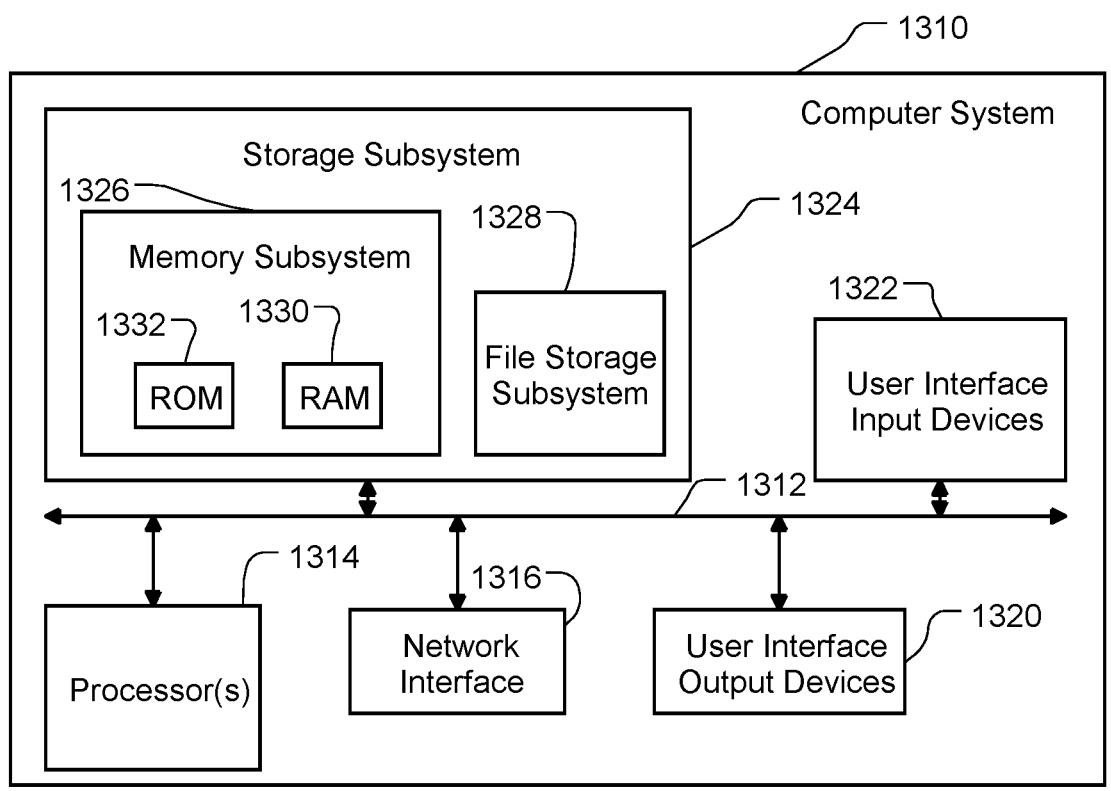
FIG. 13 is a block diagram of an example computer system that can implement various components of training and translation environments.

FIG. 13 is a block diagram of an example computer system that can implement various components of the environment 500 of FIG. 5. Computer system 1310 typically includes at least one processor 1314, which communicates with a number of peripheral devices via bus subsystem 1312. These peripheral devices may include a storage subsystem 1324, comprising for example memory devices and a file storage subsystem, user interface input devices 1322, user interface output devices 1320, and a network interface subsystem 1316. The input and output devices allow user interaction with computer system 1310. Network interface subsystem 1316 provides an interface to outside networks, including an interface to communication network 1208, and is coupled via communication network 1208 to corresponding interface devices in other computer systems.

User interface input devices 1322 may include a keyboard, pointing devices such as a mouse, trackball, touchpad, or graphics tablet, a scanner, a touchscreen incorporated into the display, audio input devices such as speech recognition systems, microphones, and other types of input devices. In general, use of the term "input device" is intended to include all possible types of devices and ways to input information into computer system 1310 or onto communication network 1208.

User interface output devices 1320 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1310 to the user or to another machine or computer system.

Storage subsystem 1324 stores programming and data constructs that provide the functionality of some or all of the modules described herein. These software modules are generally executed by processor 1314 alone or in combination with other processors.

Memory 1326 used in the storage subsystem can include a number of memories including a main random-access memory (RAM) 1330 for storage of instructions and data during program execution and a read only memory (ROM) 1332 in which fixed instructions are stored. A file storage subsystem 1328 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 1328 in the storage subsystem 1324, or in other machines accessible by the processor.

Bus subsystem 1312 provides a mechanism for letting the various components and subsystems of computer system 1310 communicate with each other as intended. Although bus subsystem 1312 is shown schematically as a single bus, alternative embodiments of the bus subsystem may use multiple busses.

Computer system 1310 can be of varying types including a workstation, server, computing cluster, blade server, server farm, or any other data processing system or computing device. Due to the ever-changing nature of computers and networks, the description of computer system 1310 depicted in FIG. 13 is intended only as a specific example for purposes of illustrating the various embodiments. Many other configurations of computer system 1310 are possible having more or fewer components than the computer system depicted in FIG. 13.

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

Some Particular Implementations

We describe various implementations of translation and creating and training language models.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to memory. The memory is loaded with computer instructions that perform various operations. A CRM implementation of the technology discloses includes a non-transitory computer readable medium storing code that, if executed by one or more computers, would cause the one or more computers to perform various operations. The system implementation and the CRM implementation are capable of performing any of the method implementations described below.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

In an implementation of method of training word embeddings is provided. The method includes determining a plurality of anchors, each anchor comprising a first word in a first domain and a second word in a second domain, training (1) a word embedding for the first domain, training (2) a word embedding for the second domain, and training (3) a transform for transforming word embedding vectors in the first domain to word embedding vectors in the second domain. In an implementation, the training minimizes a loss function that includes an anchor loss for each anchor, such that for each respective anchor of the plurality of anchors, the anchor loss for the respective anchor is based on the distance between the respective anchor's second word's embedding vector and the transform of the respective anchor's first word's embedding vector. Further, for each respective anchor of the plurality of anchors, the anchor loss for the respective anchor is zero when the distance between the respective anchor's second word's embedding vector and the transform of the respective anchor's first word's embedding vector is less than a specific tolerance.

In another implementation, method of translating a word in a first domain to a word in a second domain using a trained transform is provided. The method includes projecting, using a word embedding for a first domain, the word in the first domain to a word embedding vector in the first domain, transforming, using the trained transform, the word embedding vector in the first domain to a word embedding vector in the second domain, and identifying a word in the second domain having a projection, using a word embedding for the second domain, that is closest to the word embedding vector in the second domain. Further, the trained transform is trained by determining a plurality of anchors, each anchor comprising a first word in the first domain and a second word in the second domain, training (1) the word embedding for the first domain, training (2) the word embedding for the second domain and training (3) a transform for transforming word embedding vectors in the first domain to word embedding vectors in the second domain. Additionally, the training minimizes a loss function that includes an anchor loss for each anchor, such that for each respective anchor of the plurality of anchors, the anchor loss for the respective anchor is based on the distance between the respective anchor's second word's embedding vector and the transform of the respective anchor's first word's embedding vector, and such that, for each respective anchor of the plurality of anchors, the anchor loss for the respective anchor is zero when the distance between the respective anchor's second word's embedding vector and the transform of the respective anchor's first word's embedding vector is less than a specific tolerance.

Computer readable media (CRM) implementations of the technology disclosed include a non-transitory computer readable storage medium impressed with computer program instructions, when executed on a processor, implement the methods described above. Each of the features discussed in this particular implementation section apply equally to the CRM implementation. As indicated above, all the system features are not repeated here and should be considered repeated by reference.

Features applicable to systems, methods, and articles of manufacture are not repeated for each statutory class set of base features. The reader will understand how features identified in this section can readily be combined with base features in other statutory classes.

What is claimed is:

1. A method of training word embeddings, the method comprising:

determining a plurality of anchors, each anchor comprising a first word in a first domain and a second word in a second domain;

training (1) a word embedding for the first domain;

training (2) a word embedding for the second domain; and training (3) a transform for transforming word embedding vectors in the first domain to word embedding vectors in the second domain, wherein:

the training minimizes a loss function that includes an anchor loss for each anchor;

for each respective anchor of the plurality of anchors, the anchor loss for the respective anchor is based on a distance between the respective anchor's second word's embedding vector and the transform of the respective anchor's first word's embedding vector; and for each respective anchor of the plurality of anchors, the anchor loss for the respective anchor is zero when the distance between the respective anchor's second word's embedding vector and the transform of the respective anchor's first word's embedding vector is less than a specific tolerance.

2. The method of claim 1, wherein the first domain comprises words in a first language and the second domain comprises words in a second language.

3. The method of claim 1, further comprising translating a word in the first domain to a word in the second domain by:
projecting, using the word embedding for the first domain, the first word in the first domain to a first word embedding vector in the first domain;
transforming, using the trained transform, the first word embedding vector in the first domain to a second word embedding vector in the second domain; and
identifying a word in the second domain having a projection, using the word embedding for the second domain, that is closest to the second word embedding vector in the second domain.

4. The method of claim 1, wherein at least one anchor of the plurality of anchors represents a named entity.

5. The method of claim 1, further comprising:
determining a further plurality of anchors, each anchor of the further plurality of anchors, comprising a first word in the first domain and a second word in a third domain, wherein for each respective anchor of the further plurality of anchors, the anchor loss for the respective anchor is zero when the distance between the respective anchor's second word's embedding vector and the transform of the respective anchor's first word's embedding vectors is less than the specific tolerance.

6. The method of claim 1, wherein the loss function gives a first weight to a first anchor of the plurality of anchors and a second weight to a second anchor of the plurality of anchors.

7. A non-transitory computer-readable recording medium having a computer program recorded thereon, the computer program, when executed by one or more processors of a computer system, causes the computer system to perform a method comprising:
determining a plurality of anchors, each anchor comprising a first word in a first domain and a second word in a second domain;
training (1) a word embedding for the first domain;
training (2) a word embedding for the second domain; and
training (3) a transform for transforming word embedding vectors in the first domain to word embedding vectors in the second domain, wherein:
the training minimizes a loss function that includes an anchor loss for each anchor;
for each respective anchor of the plurality of anchors, the anchor loss for the respective anchor is based on a distance between the respective anchor's second word's embedding vector and the transform of the respective anchor's first word's embedding vector; and
for each respective anchor of the plurality of anchors, the anchor loss for the respective anchor is zero when the distance between the respective anchor's second word's embedding vector and the transform of the respective anchor's first word's embedding vector is less than a specific tolerance.

8. The non-transitory computer-readable recording medium of claim 7, wherein the first domain comprises words in a first language and the second domain comprises words in a second language.

9. The non-transitory computer-readable recording medium of claim 7, wherein the method further comprises translating a word in the first domain to a word in the second domain by:
projecting, using the word embedding for the first domain, the first word in the first domain to a first word embedding vector in the first domain;
transforming, using the trained transform, the first word embedding vector in the first domain to a second word embedding vector in the second domain; and
identifying a word in the second domain having a projection, using the word embedding for the second domain, that is closest to the second word embedding vector in the second domain.

10. The non-transitory computer-readable recording medium of claim 7, wherein at least one anchor of the plurality of anchors represents a named entity.

11. The non-transitory computer-readable recording medium of claim 7, wherein the method further comprises:
determining a further plurality of anchors, each anchor of the further plurality of anchors, comprising a first word in the first domain and a second word in a third domain, wherein for each respective anchor of the further plurality of anchors, the anchor loss for the respective anchor is zero when the distance between the respective anchor's second word's embedding vector and the transform of the respective anchor's first word's embedding vectors is less than the specific tolerance.

12. The non-transitory computer-readable recording medium of claim 7, wherein the loss function gives a first weight to a first anchor of the plurality of anchors and a second weight to a second anchor of the plurality of anchors.

13. A method of translating a word in a first domain to a word in a second domain using a trained transform, the method comprising:
projecting, using a word embedding for a first domain, the word in the first domain to a word embedding vector in the first domain;
transforming, using the trained transform, the word embedding vector in the first domain to a word embedding vector in the second domain; and
identifying a word in the second domain having a projection, using a word embedding for the second domain, that is closest to the word embedding vector in the second domain,
wherein the trained transform is trained by:
determining a plurality of anchors, each anchor comprising a first word in the first domain and a second word in the second domain;
training (1) the word embedding for the first domain;
training (2) the word embedding for the second domain; and
training (3) a transform for transforming word embedding vectors in the first domain to word embedding vectors in the second domain, wherein:
the training minimizes a loss function that includes an anchor loss for each anchor;
for each respective anchor of the plurality of anchors, the anchor loss for the respective anchor is based on a distance between the respective anchor's second word's embedding vector and the transform of the respective anchor's first word's embedding vector; and for each respective anchor of the plurality of anchors, the anchor loss for the respective anchor is zero when the distance between the respective anchor's second word's embedding vector and the transform of the respective anchor's first word's embedding vector is less than a specific tolerance.

\* \* \* \* \*